US009604799B2

(12) United States Patent
Kowk

(10) Patent No.: US 9,604,799 B2
(45) Date of Patent: Mar. 28, 2017

(54) DOCK LEVELER SEALING ASSEMBLY

(71) Applicant: Ronald Kowk, Mactier (CA)

(72) Inventor: Ronald Kowk, Mactier (CA)

( * ) Notice: Subject to any disclaimer, the term of this patent is extended or adjusted under 35 U.S.C. 154(b) by 22 days.

(21) Appl. No.: 14/619,292

(22) Filed: Feb. 11, 2015

(65) Prior Publication Data

US 2016/0229647 A1  Aug. 11, 2016

(51) Int. Cl.
B65G 69/00 (2006.01)
B65G 69/28 (2006.01)
B65G 69/34 (2006.01)

(52) U.S. Cl.
CPC ......... *B65G 69/008* (2013.01); *B65G 69/287* (2013.01)

(58) Field of Classification Search
CPC .... B65G 69/008; B65G 69/287; B65G 69/34; B65G 69/2876
USPC .................................................. 14/69.5, 71.1
See application file for complete search history.

(56) References Cited

U.S. PATENT DOCUMENTS

| 4,422,199 A | | 12/1983 | Frommelt | |
|---|---|---|---|---|
| 4,557,008 A | | 12/1985 | Jurden | |
| 4,682,382 A | | 7/1987 | Bennett | |
| 4,711,059 A | * | 12/1987 | Layne | B65G 69/008 14/71.5 |
| 5,016,391 A | * | 5/1991 | Miller | B65G 69/008 160/127 |
| 5,125,196 A | * | 6/1992 | Moody | B65G 69/008 52/173.2 |
| 6,205,721 B1 | * | 3/2001 | Ashelin | B65G 69/008 52/173.2 |
| 8,046,857 B2 | * | 11/2011 | Whitley | B65G 69/287 14/69.5 |
| 8,800,086 B1 | * | 8/2014 | Borgerding | B65G 69/2829 14/71.1 |
| 8,943,630 B2 | * | 2/2015 | Digmann | B65G 69/2876 14/69.5 |
| 9,327,922 B2 | * | 5/2016 | Eungard | B65G 69/008 |
| 9,440,806 B2 | * | 9/2016 | Gray | B65G 69/2876 |
| 2004/0055819 A1 | * | 3/2004 | Lynn | E04B 9/003 182/46 |
| 2005/0053427 A1 | * | 3/2005 | Dillon | B65G 69/008 405/4 |
| 2007/0101517 A1 | * | 5/2007 | Digmann | B65G 69/2876 14/71.1 |
| 2009/0126130 A1 | * | 5/2009 | Bettendorf | B65G 69/2876 14/71.5 |

(Continued)

Primary Examiner — Abigail A Risic

(57) ABSTRACT

A sealing assembly for a dock leveler comprises two side restraints mounted on a loading dock along respective left and right sides of the vertical face of the dock leveler. A bottom restraint is mounted on the loading dock below the vertical face of the dock leveler. A mat is removably insertable between the side restraints. The mat is sized to allow left and right edges of the mat to engage the side restraints when inserted therebetween. The mat is foldable to define a vertical portion that covers the vertical face of the dock leveler and a horizontal portion that covers at least part of the horizontal face of the dock leveler. The mat substantially restricts airflow into and out of the loading dock through the gaps when the vertical portion of the mat is inserted between the side restraints such that a bottom edge of the vertical portion of the mat engages the bottom restraint, and the loading dock door closes atop of the horizontal portion of the mat.

17 Claims, 21 Drawing Sheets

(56) References Cited

U.S. PATENT DOCUMENTS

| | | | |
|---|---|---|---|
| 2009/0165224 A1* | 7/2009 | Digmann | B65G 69/2876 14/71.1 |
| 2010/0186318 A1* | 7/2010 | Eungard | B65G 69/008 52/173.2 |
| 2010/0269427 A1* | 10/2010 | Digmann | B65G 69/008 52/173.2 |
| 2010/0319143 A1 | 12/2010 | Wessel | |
| 2011/0010871 A1* | 1/2011 | Metz | B65G 69/2876 14/69.5 |
| 2011/0061185 A1* | 3/2011 | Kimener | B65G 69/2817 14/71.1 |
| 2011/0079674 A1 | 4/2011 | Prochnow et al. | |
| 2016/0096696 A1* | 4/2016 | Colbert | B65G 69/2876 14/78 |

* cited by examiner

FIG. 14A  FIG. 14B

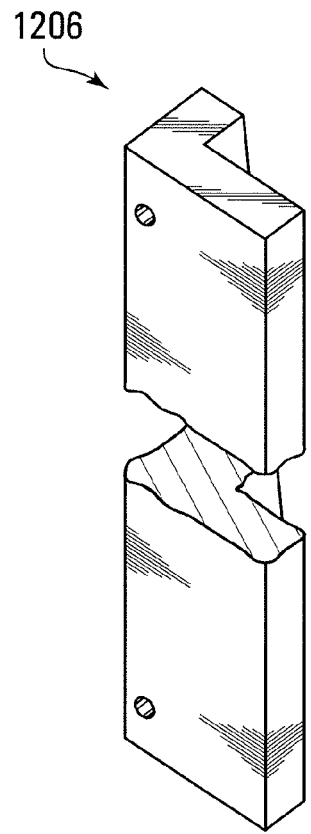 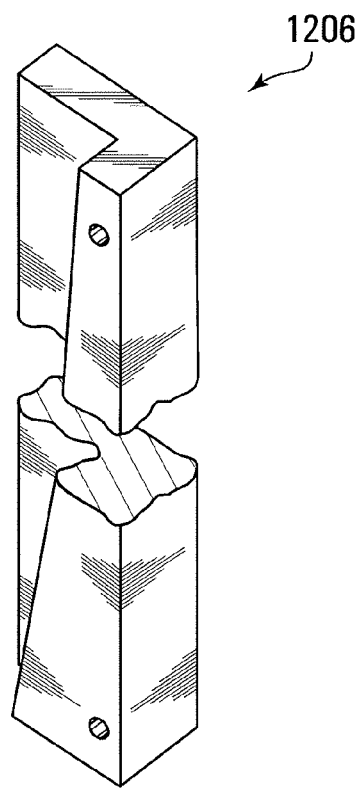
FIG. 15A  FIG. 15B
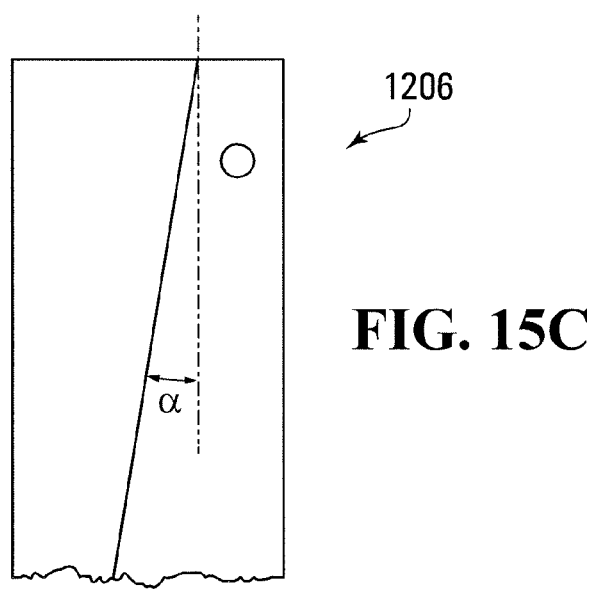
FIG. 15C

DOCK LEVELER SEALING ASSEMBLY

TECHNICAL FIELD

This relates to sealing a dock leveler, and more particularly to an assembly for sealing a dock leveler retracted into a loading dock beneath a loading dock door.

BACKGROUND

A dock leveler is commonly installed beneath the door of a loading dock. So installed, the dock leveler is operable to establish a bridge between a loading dock and a truck docked thereto, while accounting for any differences in height between the floor of the loading dock and the bed of the truck. The bridge allows goods to be readily moved between the loading dock and the truck, e.g., by forklifts driven over the bridge.

However, when installed, the interface between the dock leveler and the loading dock provides points of ingress and egress of heat, air, moisture, and vermin (i.e., rodents, insects, or the like), into and out of the loading dock, even when the dock leveler is not being used and the loading dock door is closed. Further, the dock leveler, typically made of metal, may serve as a conductor for carrying heat into and out of the loading dock area. This movement of heat (or cold), air, moisture, and vermin may result in damage to goods stored in the loading dock, and/or increased operating costs (e.g., energy costs).

Conventional devices for sealing a dock leveler suffer from various disadvantages. For example, weather stripping installed at the edges of a dock leveler may allow moisture and small-sized vermin to enter the loading dock area, and does little to prevent conduction of heat through the dock leveler. Further, such devices are prone to being damaged during operation of the loading dock, and are often not replaced.

Accordingly, there is a need for improved seals for dock levelers installed in loading docks.

SUMMARY

According to one aspect of the present invention, there is provided a sealing assembly for a dock leveler retracted into a loading dock beneath a loading dock door, the dock leveler and the loading dock defining gaps between a vertical face of the dock leveler and an exterior surface of the loading dock and between a horizontal face of the dock leveler and a floor of the loading dock, the gaps permitting airflow into and out of the loading dock, the assembly comprising: two side restraints mounted on the loading dock along respective left and right sides of the vertical face of the dock leveler; a bottom restraint mounted on the loading dock below the vertical face of the dock leveler; a mat removably insertable between the side restraints, the mat sized to allow left and right edges of the mat to engage the side restraints when inserted therebetween, the mat foldable to define a vertical portion that covers the vertical face of the dock leveler and a horizontal portion that covers at least part of the horizontal face of the dock leveler; and the mat substantially restricting airflow into and out of the loading dock through the gaps when the vertical portion of the mat is inserted between the side restraints such that a bottom edge of the vertical portion of the mat engages the bottom restraint, and the loading dock door closes atop the horizontal portion of the mat.

According to another aspect of the present invention, there is provided a method of sealing a dock leveler retracted into a loading dock beneath a loading dock door, the dock leveler and the loading dock defining gaps between a vertical face of the dock leveler and an exterior surface of the loading dock and between a horizontal face of the dock leveler and a floor of the loading dock, the gaps permitting airflow into and out of the loading dock, the method comprising: mounting two side restraints on the loading dock along respective left and right sides of the vertical face of the dock leveler; mounting a bottom restraint on the loading dock below the vertical face of the dock leveler; inserting a mat between the side restraints with left and right edges of the mat engaging the side restraints, until a bottom edge of the mat engages the bottom restraint; folding the mat to cover the vertical face of the dock leveler and at least part of a horizontal face of the dock leveler; and closing the loading dock door atop the horizontal portion of the mat such that airflow into and out of the loading dock through the gaps is substantially restricted.

Other features will become apparent from the drawings in conjunction with the following description.

BRIEF DESCRIPTION OF THE DRAWINGS

In the figures which illustrate example embodiments,

FIG. 14A, FIG. 14B, and FIG. 14C are, respectively, front perspective, rear perspective, and rear elevation views of a left restraint, exemplary of another embodiment;

FIG. 15A, FIG. 15B, and FIG. 15C are, respectively, front perspective, rear perspective, and rear elevation views of a right restraint, exemplary of another embodiment;

DETAILED DESCRIPTION

Figure 1:
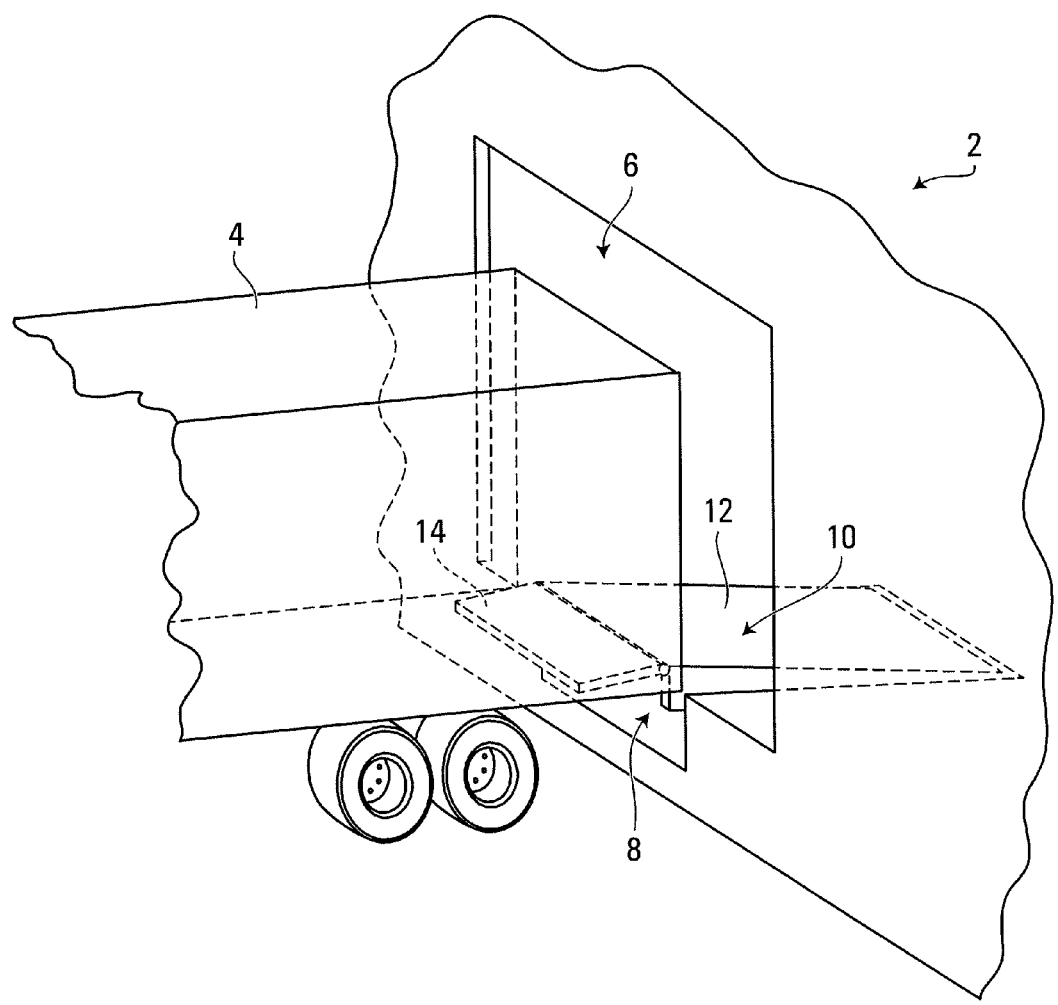
FIG. 1 is a perspective view of a dock leveler extending from a loading dock to engage a docked truck.
Figure 2:
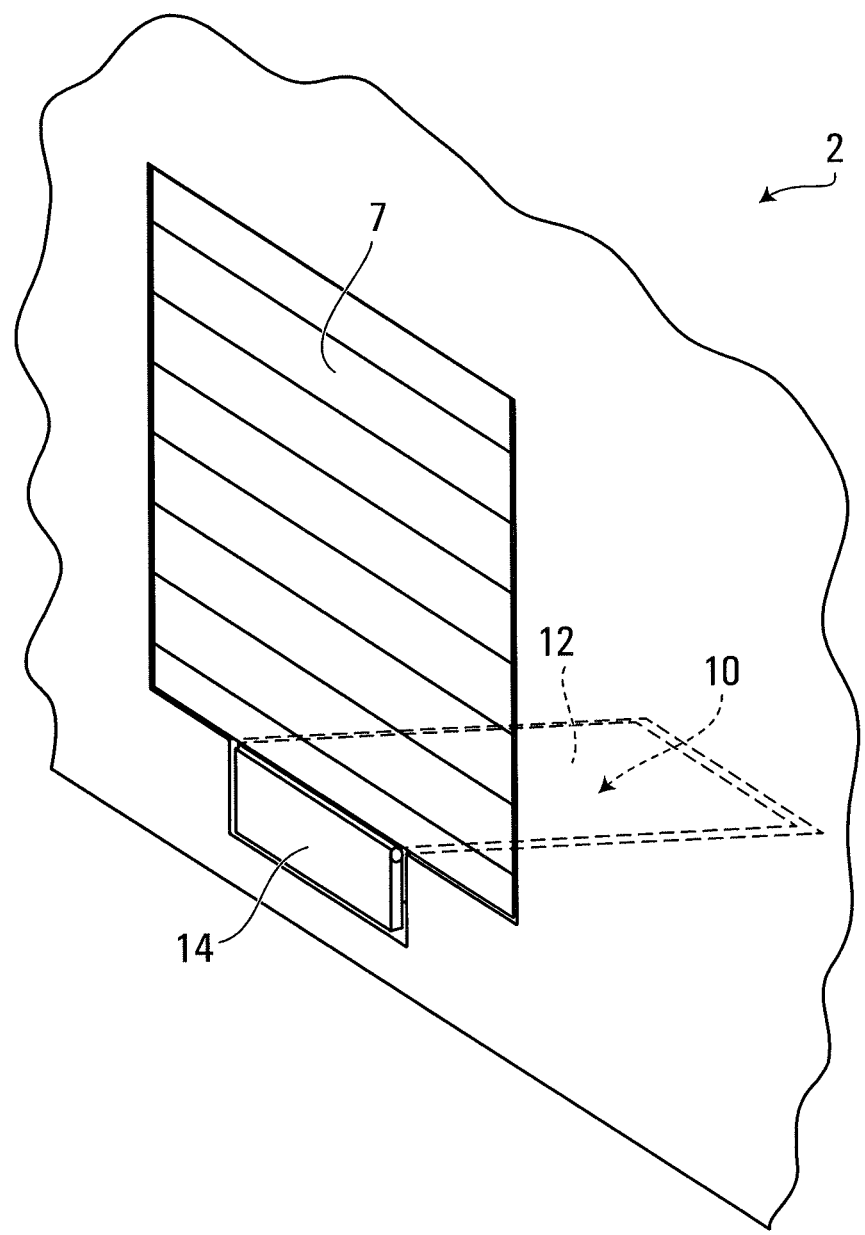
FIG. 2 is a perspective view of the dock leveler of FIG. 1 retracted into the loading dock, with a loading dock door closed atop the dock leveler.

FIG. 1 depicts a dock leveler 10 extended from a loading dock 2, while FIG. 2 depicts dock leveler 10 retracted into loading dock 2. Exemplary embodiments of an assembly for sealing a dock leveler (e.g., dock leveler 10) retracted into a loading dock (e.g., loading dock 2) are described herein. As will become apparent, when a dock leveler is sealed by this assembly, airflow into and out of the loading dock through the interface between the loading dock and the dock leveler is substantially restricted. Similarly, movement of heat, moisture, and vermin may also be substantially restricted.

As depicted in FIG. 1, dock leveler 10 may be installed within pit 8 of dock 2, below a door 7 (FIG. 2) of opening 6. Dock leveler 10 may be a conventional dock leveler, operable to switch between extended and retracted positions by way of hydraulic or mechanical action.

In particular, dock leveler 10 is operable to extend from dock 2, e.g., for engaging the bed of a truck 4 docked at dock 2. In this extended position, dock leveler 10 bridges a gap between truck 4 and dock 2, thereby allowing goods to be moved between truck 4 and dock 2 through opening 6. For example, a forklift may be driven on a ramp formed by surfaces 12 and 14 of dock leveler 10.

Dock leveler 10 is also operable to retract into dock 2 when it is not being used, as shown in FIG. 2. As depicted, in this retracted position, surface 12 of dock leveler 10 is substantially level with floor 22 (FIG. 3A) of dock 2. Meanwhile, surface 14 flips downward to be substantially flush with exterior wall 24 (FIG. 3B) of dock 2. Door 7 of dock 2 may be closed downwardly atop dock leveler 10 to shut opening 6.

Unfortunately, when dock leveler 10 is retracted into dock 2 and door 7 is closed, gaps between dock leveler 10 and dock 2 allow ingress and egress of one or more of heat (or cold), air, moisture, and vermin into and out of dock 2.

Figure 3A:
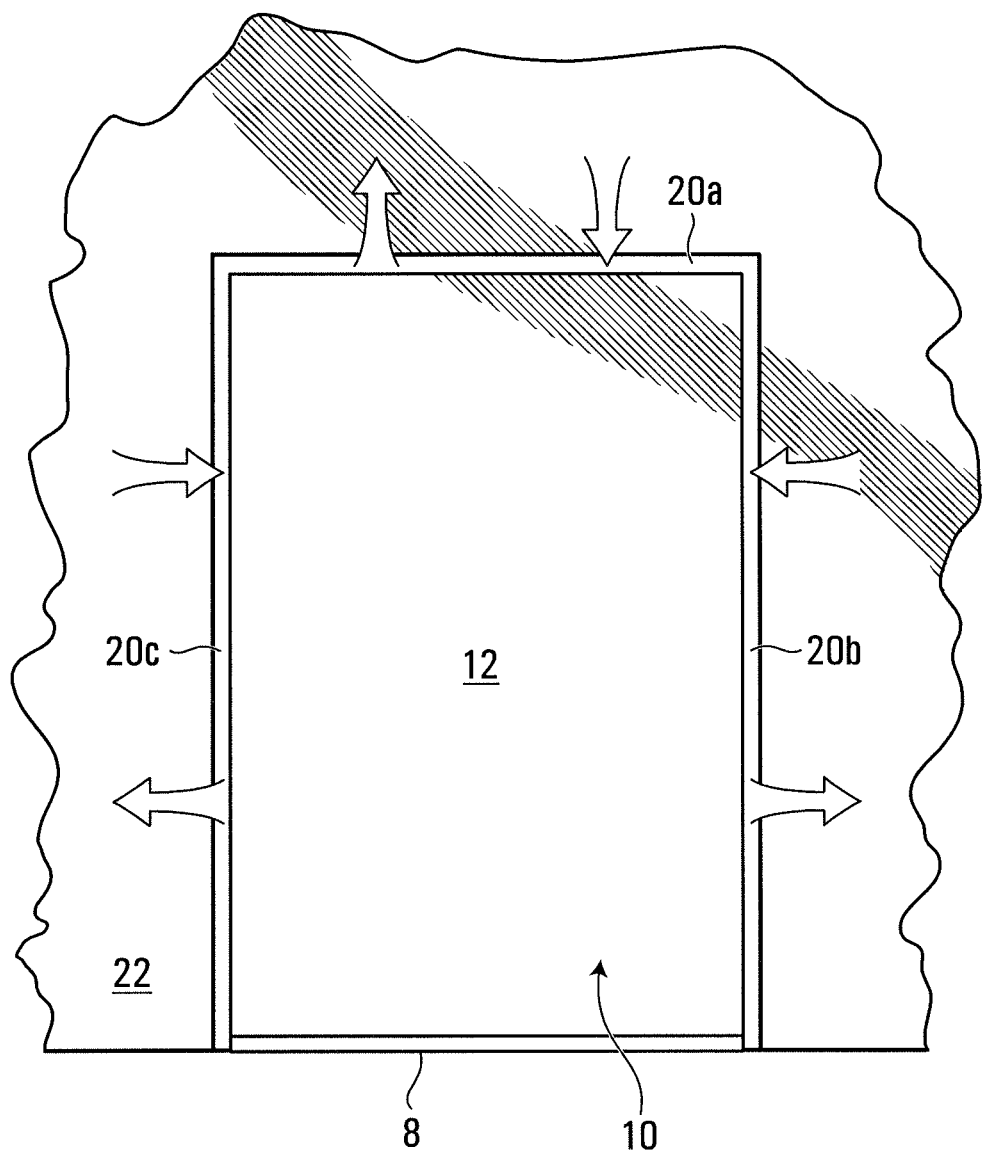
FIG. 3A is a top plan view of the retracted dock leveler of FIG. 2.

For example, as depicted in FIG. 3A, gaps are formed between floor 22 of dock 2 and horizontal surface 12 of dock leveler 10. In particular, a gap 20a is formed between floor 22 and the rear edge of surface 12. Similarly, a gap 20b is formed between floor 22 and the right edge of surface 12, and a gap 20c is formed between floor 22 and the left edge of surface 12. Gaps 20a, 20b, and 20c may each span up to several inches. As such, gaps 20a, 20b, and 20c are wide enough to permit substantial flow of heat, air, moisture therethrough and to permit large vermin such as rats or the like to travel therethrough, between the interior of dock 2 and pit 8 (FIG. 1) below surface 12.

Figure 3B:
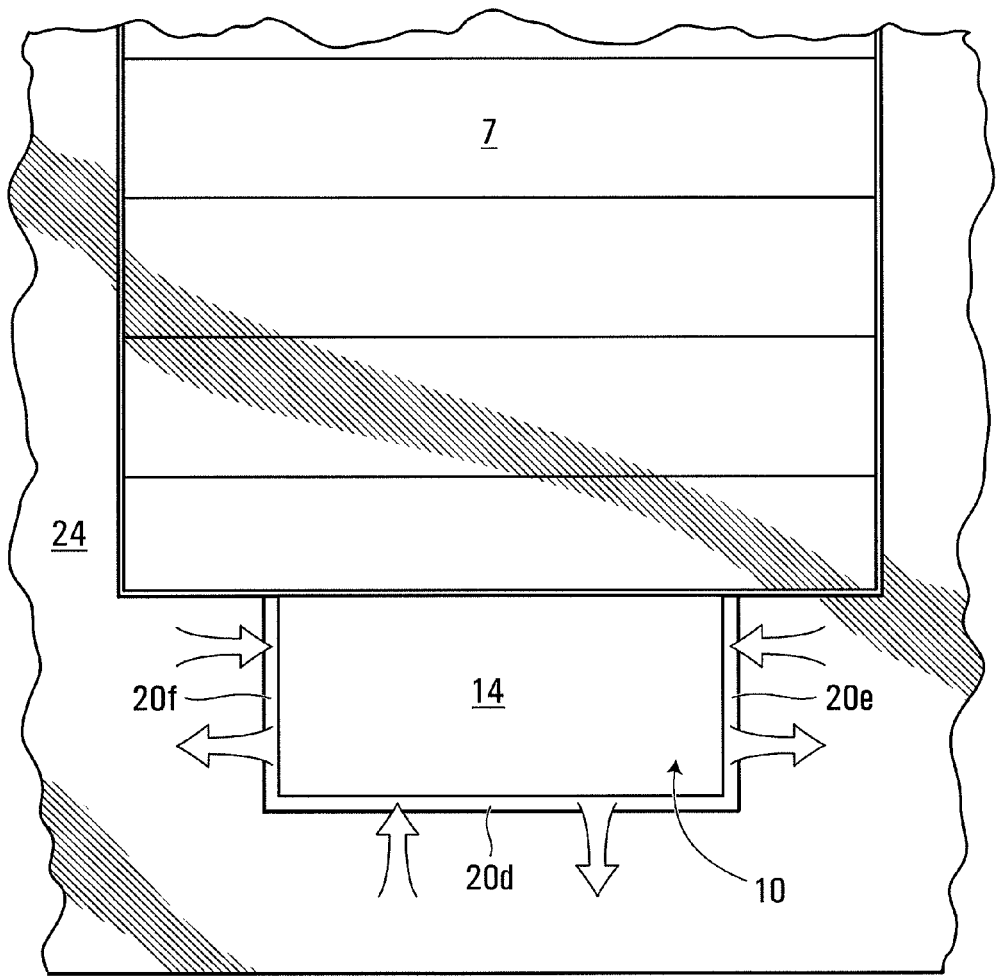
FIG. 3B is an front elevation view of the retracted dock leveler of FIG. 2.

As depicted in FIG. 3B, gaps are also formed between exterior wall 24 of dock 2 and vertical surface 14 of dock leveler 10. In particular, a gap 20d is formed between the bottom edge of surface 14 and wall 24; a gap 20e is formed between the right edge of surface 14 and wall 24; and a gap 20f is formed between the left edge of surface 14 and wall 24. Like the gaps formed between floor 22 and surface 12 (FIG. 3A), gaps 20d, 20e, and 20f may also each span up to several inches (e.g. 1-2 inches). As such, gaps 20d, 20e, and 20f are likewise wide enough to permit substantial flow of heat (or cold), air, and moisture therethrough, and to permit large vermin to travel therethrough, between the exterior of dock 2 and pit 8 (FIG. 1) behind vertical surface 14.

Thus, gaps 20a, 20b, 20c, 20d, 20e, and 20f (collectively referred to as gaps 20) provide a path extending between the interior of dock 2 and the exterior of dock 2 through pit 8, below horizontal surface 12 and behind vertical surface 14. Accordingly, one or more of heat, air, moisture, and vermin may travel through gaps 20 into and out of dock 2, even when door 7 is closed.

Figure 4A:
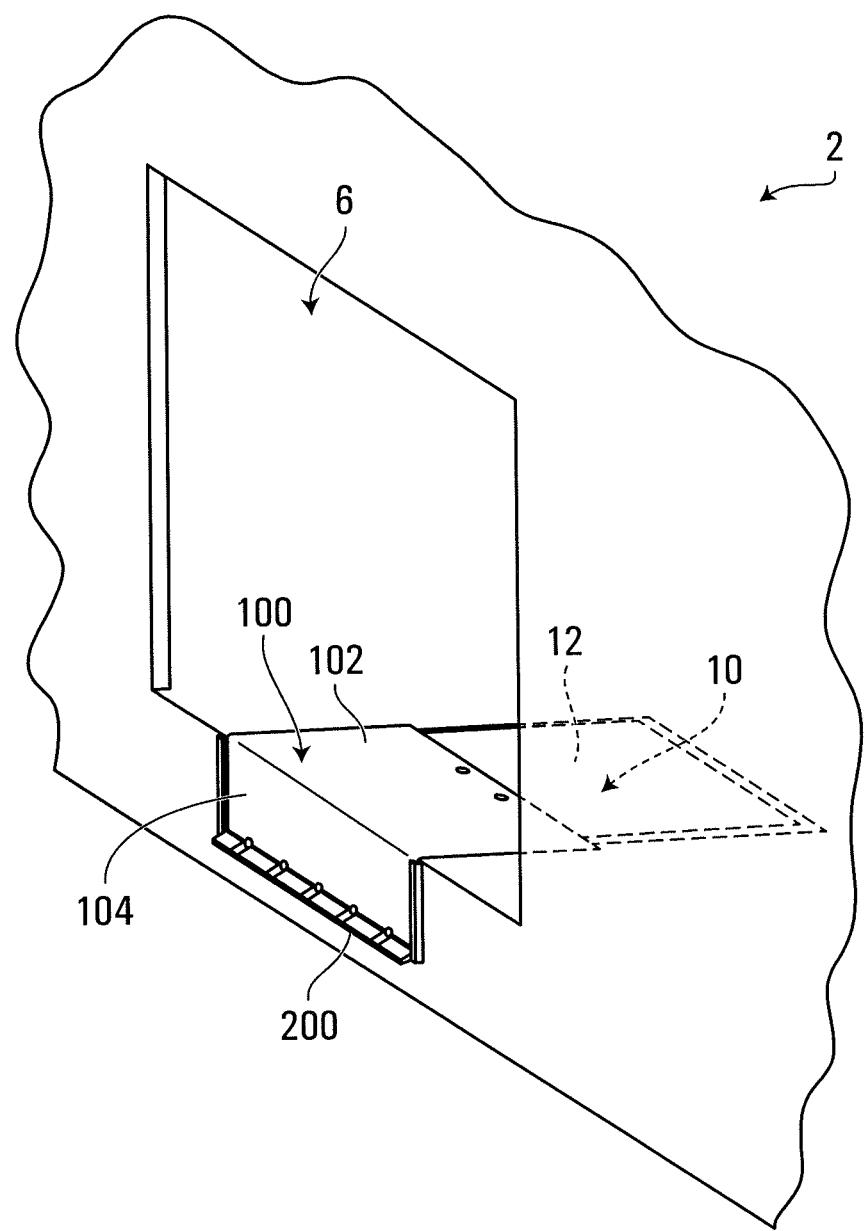
FIG. 4A is a perspective view of a sealing assembly including a mat and a mat restraining frame, exemplary of an embodiment, deployed over the retracted dock leveler of FIG. 2.
Figure 4B:
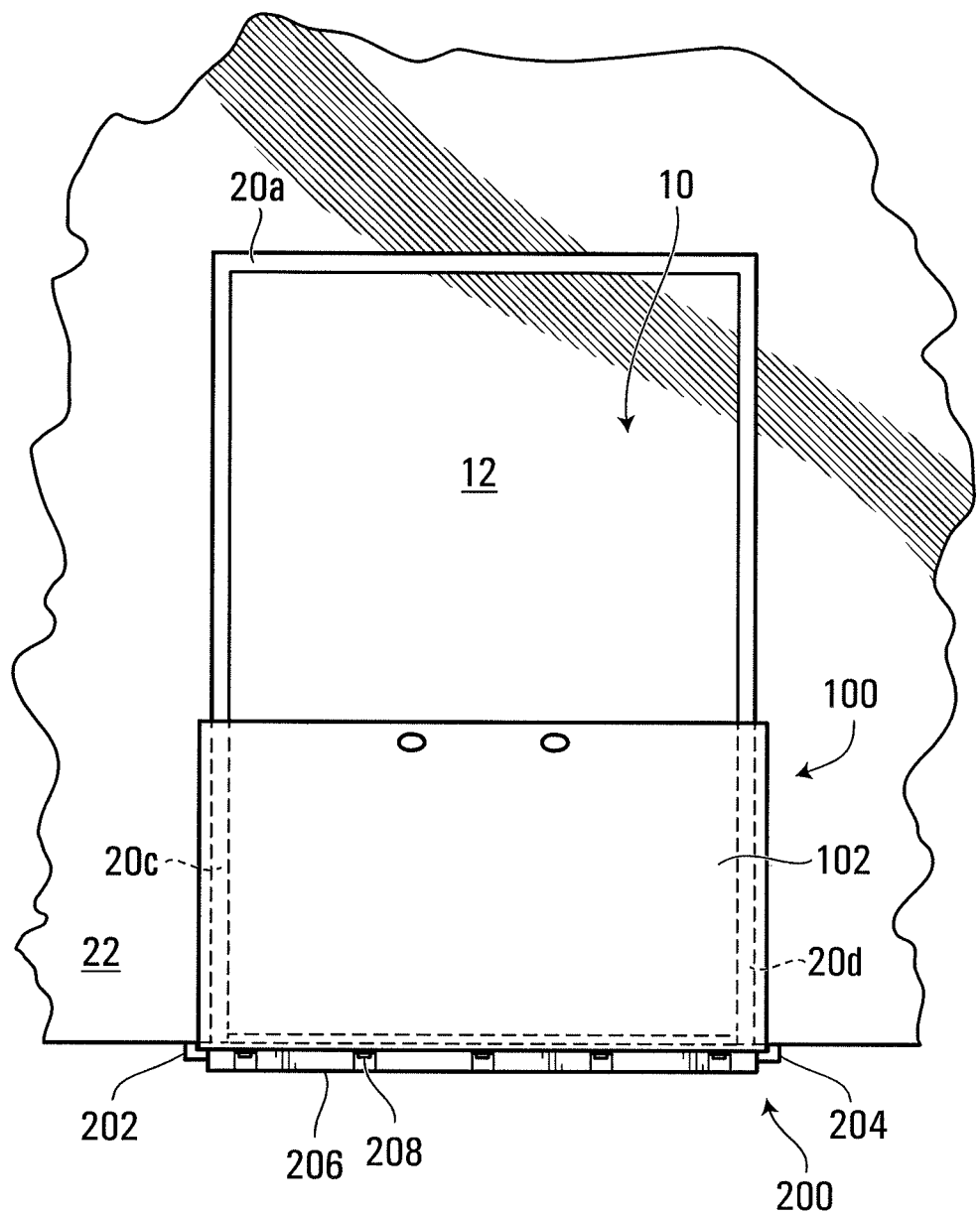
FIG. 4B is a top plan view of the sealing assembly of FIG. 4A.
Figure 4C:
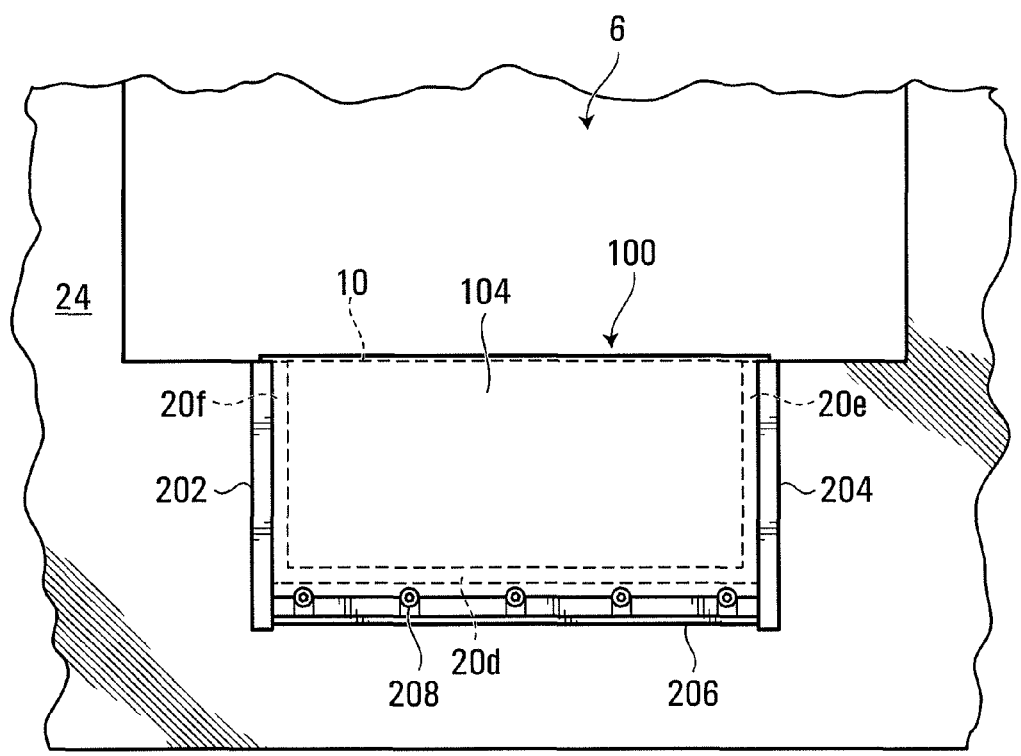
FIG. 4C is a front elevation view of the sealing assembly of FIG. 4A.

FIG. 4A, FIG. 4B, and FIG. 4C depict a sealing assembly including a mat 100 and a mat restraining frame 200 that may be used to restrict the travel of heat (or cold), air, moisture, and vermin through gaps 20. Mat 100 may be removably deployed by folding mat 100 over dock leveler 10 to cover parts thereof and inserting mat 100 into frame 200. When deployed, mat 100 also partly covers gaps 20, as detailed below. As depicted in FIG. 4B and FIG. 4C, mat restraining frame 200 includes a left restraint 202, a right restraint 204, and a bottom restraint 206, for respectively engaging left, right, and bottom edges of mat 100, when mat 100 is inserted in frame 200.

Figure 5A:
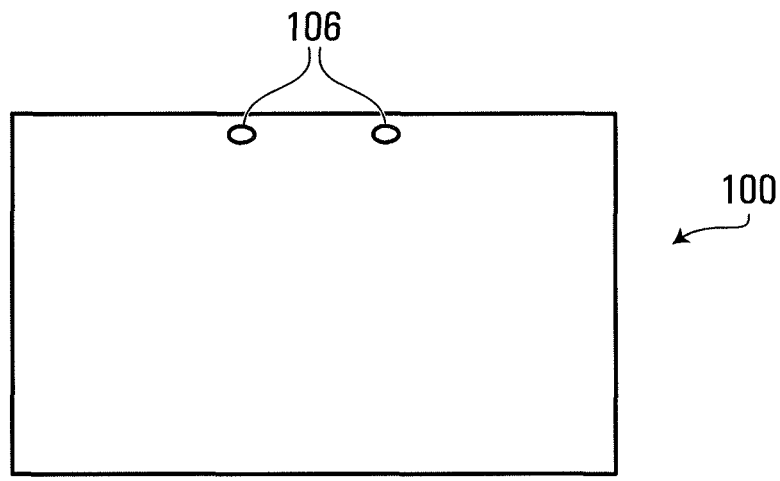
FIG. 5A is a top plan view of the mat of FIG. 4A.

Mat 100 is substantially rectangular in shape, as depicted in FIG. 5A. Mat 100 is sized to have a width corresponding to the spacing between left restraint 202 and right restraint 204 of frame 200 when mounted (FIG. 4C). In particular, mat 100 has a width that allows its left and right edges to engage left restraint 202 and right restraint 204, respectively, and be retained therein. Mat 100 has a length that allows mat 100 to extend from the interior of dock 2 (i.e., behind door 7) to bottom restraint 206 of frame 200. As such, mat 100 has a length that allows it to cover at least part of horizontal surface 12 of dock leveler 10, and all of vertical surface 14 of dock leveler 10. As will be appreciated, the width and length of mat 100 may be adjusted to suit a particular configuration of a dock leveler and a loading dock. In some embodiments, mat 100 may have a length that allows it to cover all of horizontal surface 12 and all of vertical surface 14.

Mat 100 may include openings 106 to provide handholds. As shown, openings 106 are oval in shape. However, openings 106 may also be another shape allowing mat 100 to be readily gripped by a user. Openings 106 are spaced to allow mat 100 to be gripped comfortably by two hands. In other embodiments, openings 106 may be replaced by other handholds such as handles or the like, or simply be omitted.

Figure 5B:
FIG. 5B is a front elevation view of the mat of FIG. 4A.

In the depicted embodiment (FIG. 5B), mat 100 has a thickness of approximately 0.25-0.5 inches. However, in other embodiments, the thickness of mat 100 may vary between 0.2 inches and 2 inches. Generally, mat 100 should allow door 7 to close.

The thickness of mat 100 may be chosen so that mat 100 is heavy enough to rest stably when laid horizontally, but at the same time be light enough to be handled by one person. The thickness of mat 100 may also be chosen so that mat 100 has sufficient durability. The thickness of mat 100 may also be chosen so that mat 100 is flexible enough to be folded, e.g., over dock leveler 10 during operation. The thickness of mat 100 may also be chosen so that mat 100 provides a desired degree of thermal insulation when deployed.

Mat 100 may be formed from a conventional high-density polyethylene (HDPE) plastic that is durable, flexible, fluid (water/air) impermeable, and thermal insulating. In one specific embodiment, mat 100 may be formed from Sani- Armour™ HDPE plastic sheeting, distributed by Plastruct Polyzone (Vineland, Ontario). In other embodiments, mat 100 may be formed from other types of plastics, including puckboard plastics, fiber-reinforced plastics, or the like. Mat 100 may also be formed from a suitable rubber (e.g., a reinforced rubber) or a composite material (e.g., a rubber-plastic composite).

The material of mat 100 is chosen to be flexible to permit folding. The material of mat 100 is also chosen to be water and air impermeable to prevent moisture/air from passing through mat 100. The material of mat 100 is also chosen to be durable and long-lasting, namely, to be resistant to wear and tear associated with inserting and removing mat 100 from frame 200, and resistant to extreme and all-season weather/temperature conditions.

Optionally, the material of mat 100 may be chosen from thermally insulating materials, to reduce the heat conduction in and out of dock 2 through dock leveler 10. Optionally, the material of mat 100 may be chosen from "food grade" materials certified by the United States Food and Drug Administration for use in association with food processing, transportation, or storage.

Figure 6A:
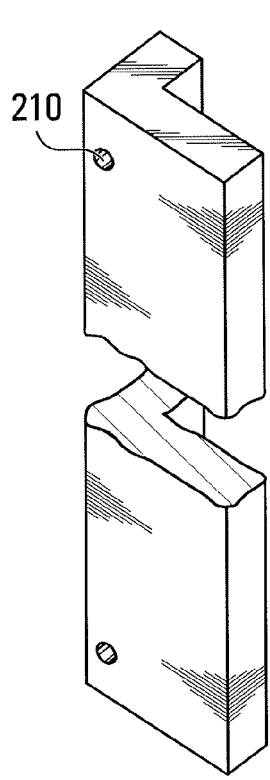
FIG. 6A and FIG. 6B are, respectively, front perspective and rear perspective views of a left restraint of the mat restraining frame of FIG. 4A.
Figure 6B:
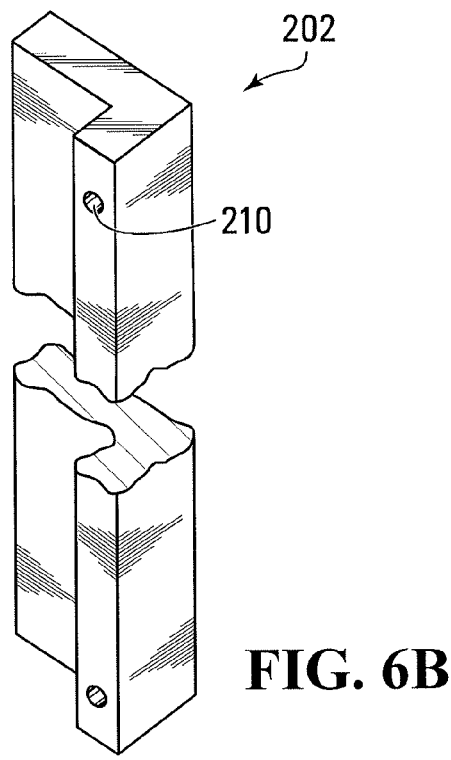
Figure 7A:
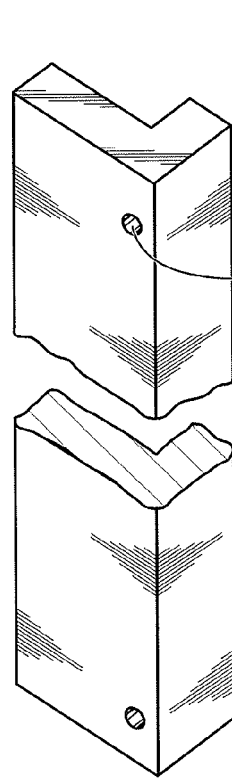
FIG. 7A and FIG. 7B are, respectively, front perspective and rear perspective views of a right restraint of the mat restraining frame of FIG. 4A.
Figure 7B:
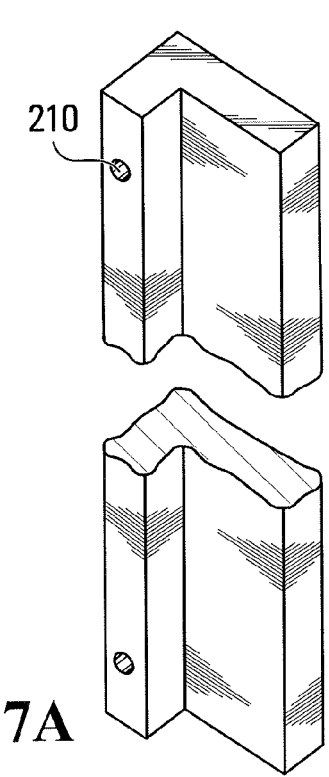

As noted, mat restraining frame 200 includes a left restraint 202, a right restraint 204, and a bottom restraint 206. FIG. 6A and FIG. 6B are, respectively, front and rear perspective views of left restraint 202. As depicted, left restraint 202 is an elongate bar with an L-shaped cross-section. FIG. 7A and FIG. 7B are, respectively, front and rear perspective views of right restraint 204. As depicted, right restraint 204 is also an elongate bar and has an L-shaped cross-section that mirrors that of left restraint 202. Each one of restraints 202 and 204 includes holes 210 for receiving bolts, allowing the restraints to be mounted (e.g., to wall 24). Each one of restraints 202 and 204 has a length that extends from the bottom lip of opening 6 of dock 2 to below dock leveler 10. Further, each one of restraints 202 and 204 is shaped such that when mounted, a channel is defined having a size that prevents an edge of mat 100 received therein from slipping out laterally, and is fitted to the thickness of mat 100.

Figure 8A:
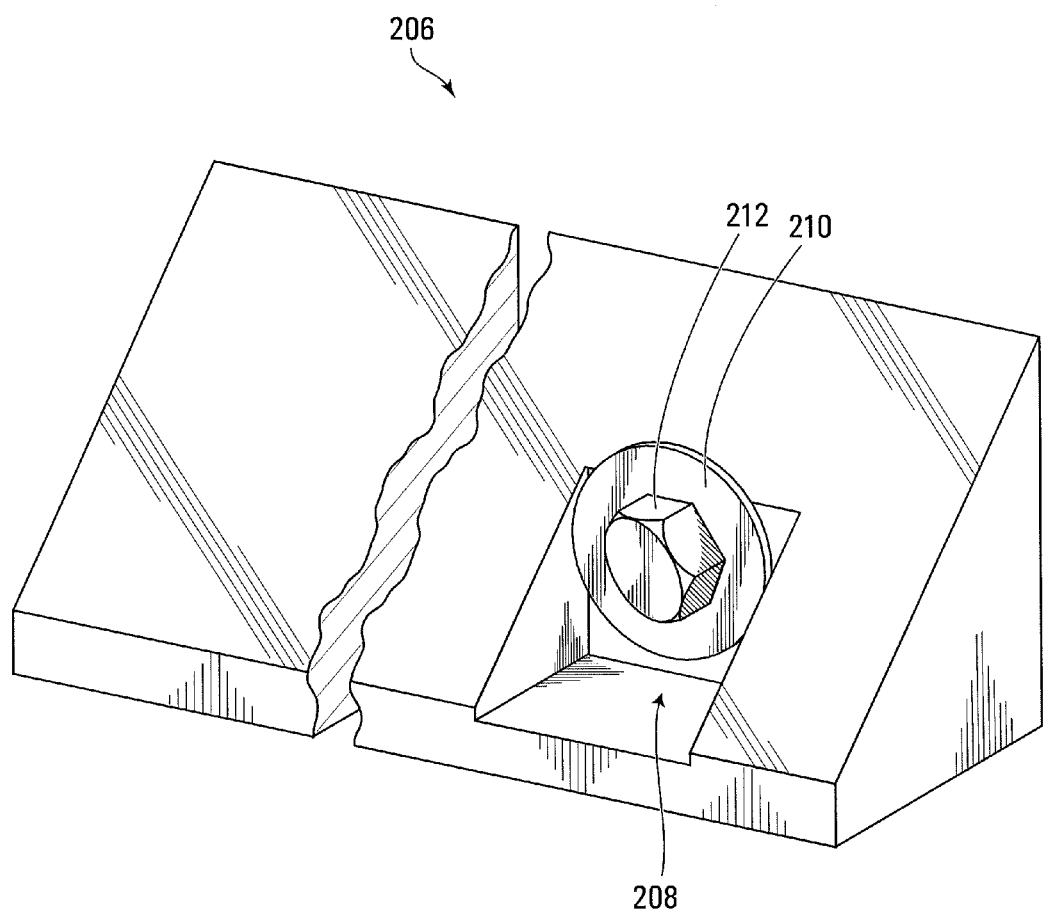
FIG. 8A and FIG. 8B are, respectively, front perspective and side elevation views of the bottom restraint of the mat restraining frame of FIG. 4A.
Figure 8B:
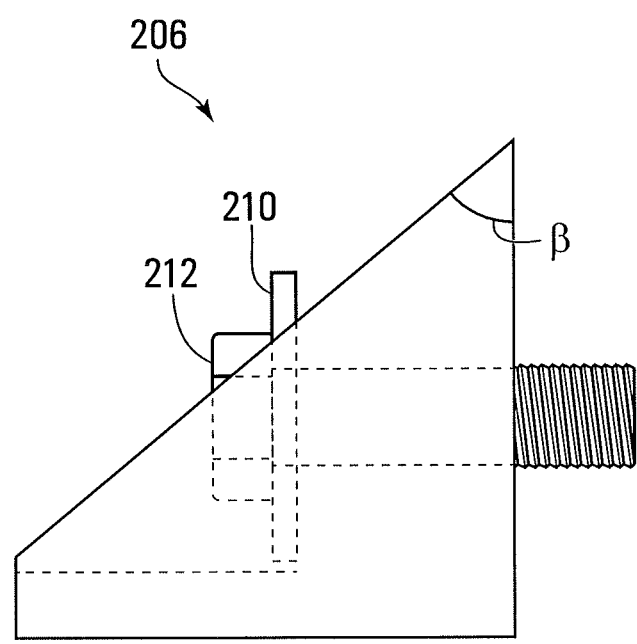

FIG. 8A and FIG. 8B depict bottom restraint 206. As depicted, bottom restraint 206 is an elongate beam with a top surface that slopes at an angle β (FIG. 8B) of approximately 45 degrees. In other embodiments, this angle β may be between approximately 20 to 70 degrees. This angle is selected to prevent any debris (e.g., warehouse debris, dirt, etc.) from accumulating on bottom restraint 206. As such, the bottom edge of mat 100 may engage bottom restraint 206 and form a seal thereagainst without interference of any such debris.

Bottom restraint 206 includes a plurality of flanges 208 that extend upwardly therefrom to engage the bottom edge of mat 100 and retain that edge against bottom restraint 206. In the depicted embodiment, bottom restraint 206 includes five flanges 208 (FIG. 4C), spaced from one another by a distance of approximately 16 inches on sides (18 inches or better). In other embodiments, a greater or fewer number of flanges may be included in bottom restraint 206, and the spacing between flanges may be varied, so long as the bottom edge of mat 100 is tightly held against bottom restraint 208.

As depicted, each flange 208 is formed by a washer 210 secured to bottom restraint 206 by a bolt 212. The top end of each washer 210 engages and holds the bottom edge of mat 100. In the depicted embodiment, the diameter of each washer 210 is approximately has abate 1% inches outer diameter and 0.5 inches inner diameter. Each bolt 210 may extend through bottom restraint 206, and thereby also be used to mount bottom restraint 206 (e.g., to wall 24). Thus, washer 210 and bolt 212 each serve two functions, namely, mounting bottom restraint 206 and providing flanges 208, conveniently reducing the number of required components and concomitant costs.

Bottom restraint 206 has a length that allows it to extend beyond left and right edges of front surface 14 of dock leveler 10 (FIG. 4C), e.g., from left restraint 202 to right restraint 204.

Restraints 202, 204, and 206 may each be formed from a material similar to the material of mat 100, chosen to be durable and long-lasting, as discussed above with reference to mat 100. For example, restraints 202, 204, and 206 is formed from a material that resists impacts resulting from contact with goods and equipment. Thus, restraints 202, 204, and 206 may each be formed from a conventional HDPE plastic, a fiber-reinforced plastic, a rubber, a rubber-plastic composite, or the like. Other materials may also be suitable, e.g., wood or metal.

Figure 9:
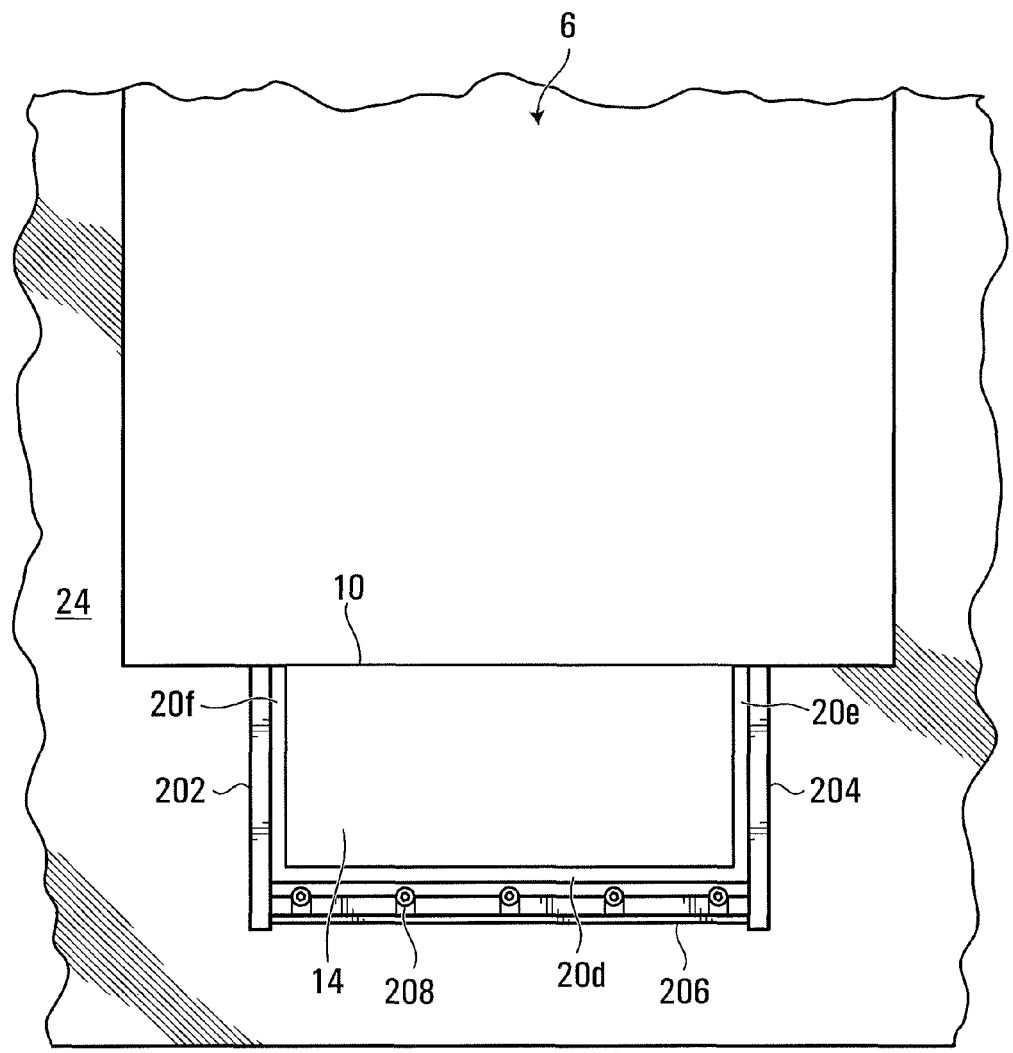
FIG. 9 is a front elevation view of the mat restraining frame of FIG. 4A and the retracted dock leveler of FIG. 2.
Figure 10:
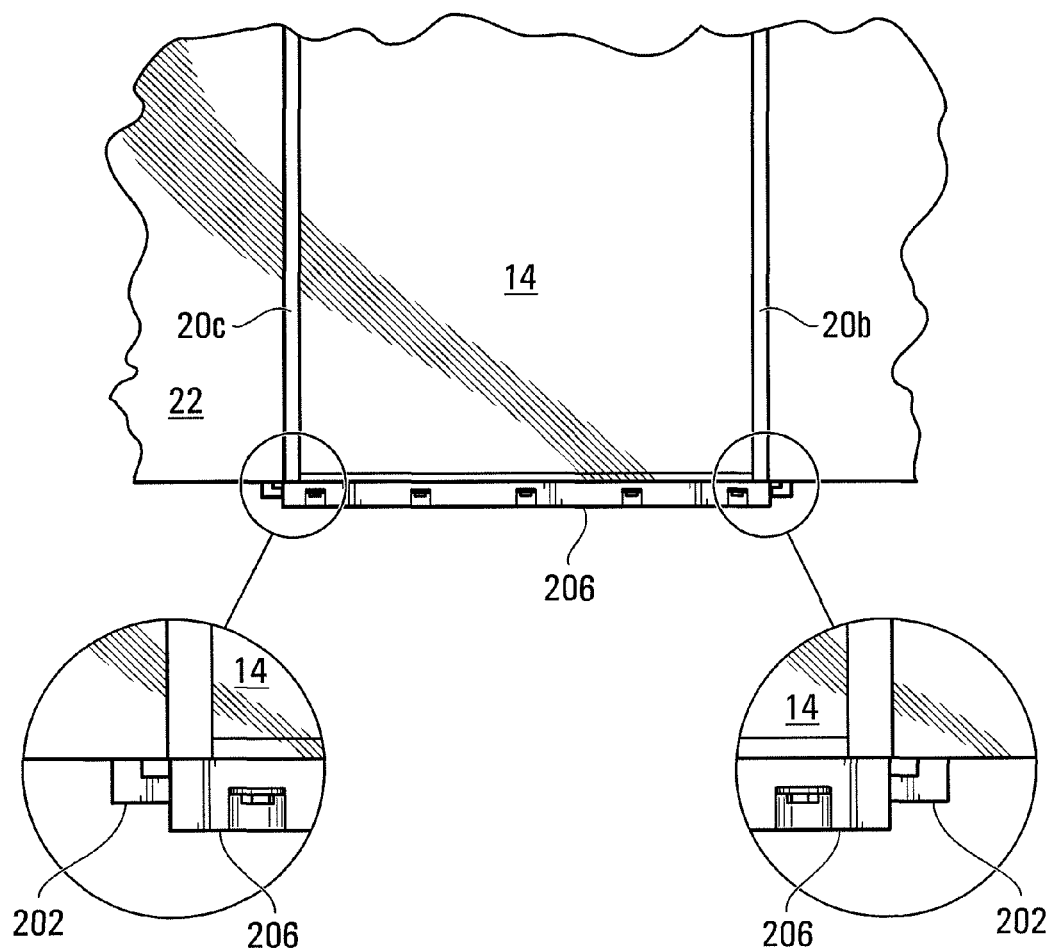
FIG. 10 is a top plan view of the mat restraining frame of FIG. 4A and the retracted dock leveler of FIG. 2.

The operation of the sealing assembly is further discussed with reference to FIG. 9 through FIG. 13A/13B. Mat restraining frame 200 is mounted on exterior wall 24 of dock 2, as depicted in FIG. 9. In particular, left restraint 202 and right restraint 204 are mounted on wall 24 on opposite sides of dock leveler 10, while bottom restraint 206 is mounted on wall 24 below dock leveler 10. As depicted in FIG. 9 and FIG. 10, when mounted, left restraint 202 is positioned to the left of gap 20f (and gap 20c), right restraint 204 is positioned to the right of gap 20e (and gap 20b), and bottom restraint 206 is positioned beneath gap 20d. Further, as depicted in FIG. 10, when mounted, left restraint 202 and right restraint 204 each define a channel for receiving a side edge of mat 100.

Figure 11:
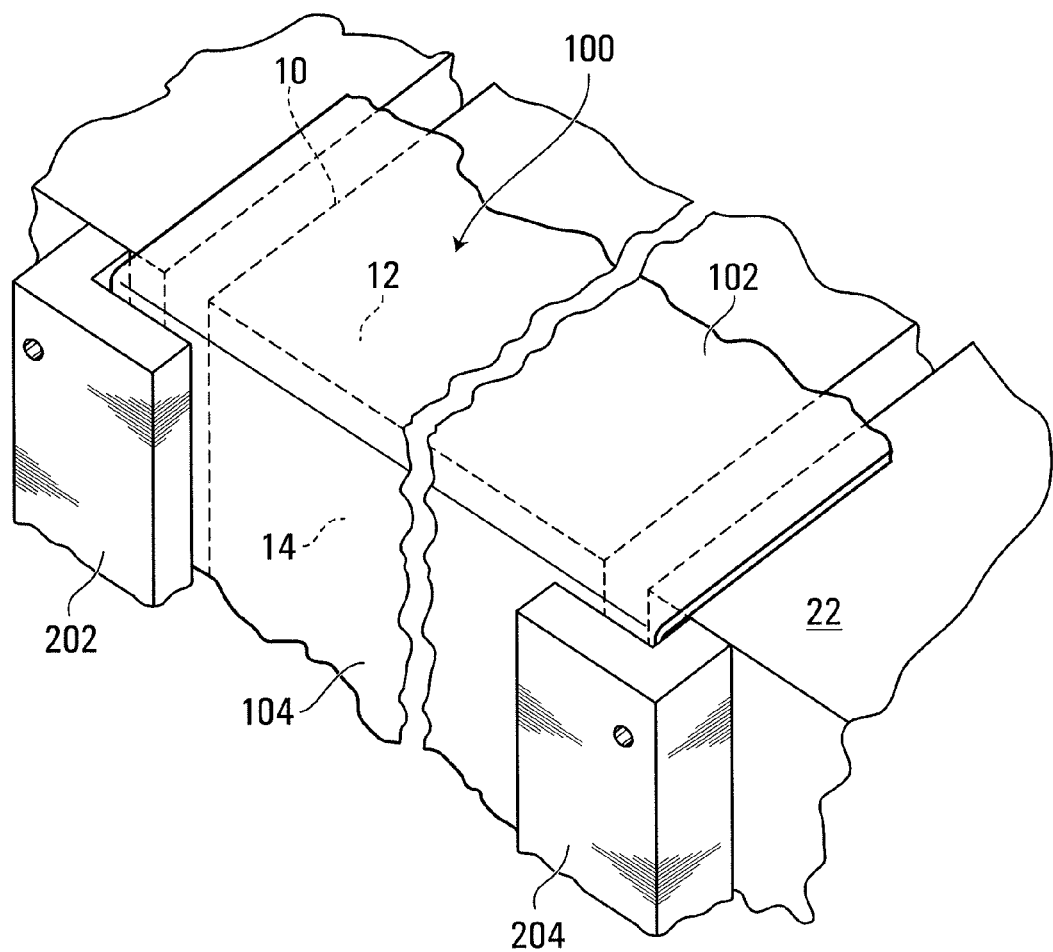
FIG. 11 is a partial front perspective view of the sealing assembly of FIG. 4A, deployed over the retracted dock leveler of FIG. 2.
Figure 12:
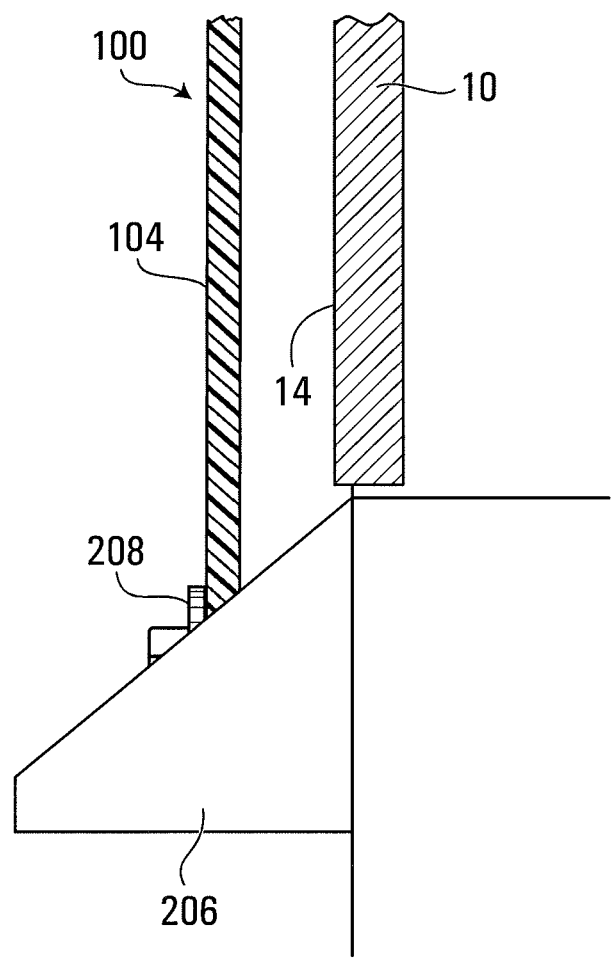
FIG. 12 is a partial side elevation view of the sealing assembly of FIG. 4A, deployed over the retracted dock leveler of FIG. 2.

When dock leveler 10 is not in use, and is retracted into pit 8 of dock 2, it may be sealed by deploying mat 100 to cover part of dock leveler 10 and to engage frame 200. In particular, a horizontal portion 102 of mat 100 may be laid overtop a portion of horizontal surface 12 of dock leveler 10, with a top edge of portion 102 positioned inside dock 2 (i.e., inside door 7), and oriented to extend from this top edge towards opening 6 of dock 2 (FIG. 4A). At the lip of dock leveler 10, namely, where horizontal surface 12 meets vertical surface 14, mat 100 is folded to provide a vertical portion 104 that extends substantially parallel to vertical surface 14, as depicted in FIG. 11. As depicted, the left edge of portion 104 is inserted in the channel defined by mounted left restraint 202, and the right edge of portion 104 is inserted in the channel defined by mounted right restraint 204. Vertical portion 104 of mat 100 is inserted downward until its bottom edge meets the top surface of bottom restraint 206, where it is engaged by flanges 208, as depicted in FIG. 12.

When mat 100 is deployed, the side edges of horizontal portion 102 of mat 100 extend past respective side edges of horizontal surface 12 of dock leveler 10 and reach floor 22. As such, portion 102 covers part of horizontal surface 12, as well as parts of gaps 20c and 20d (FIG. 4B) adjacent thereto. Similarly, the side edges of vertical portion 104 of mat 100 extend past respective side edges of vertical surface 14 of dock leveler 10 and reach wall 24, while the bottom edge of portion 104 reaches bottom restraint 206. As such, portion 104 covers vertical surface 14 as well as gaps 20d, 20e, and 20f (FIG. 4B and FIG. 4C).

Figure 13A:
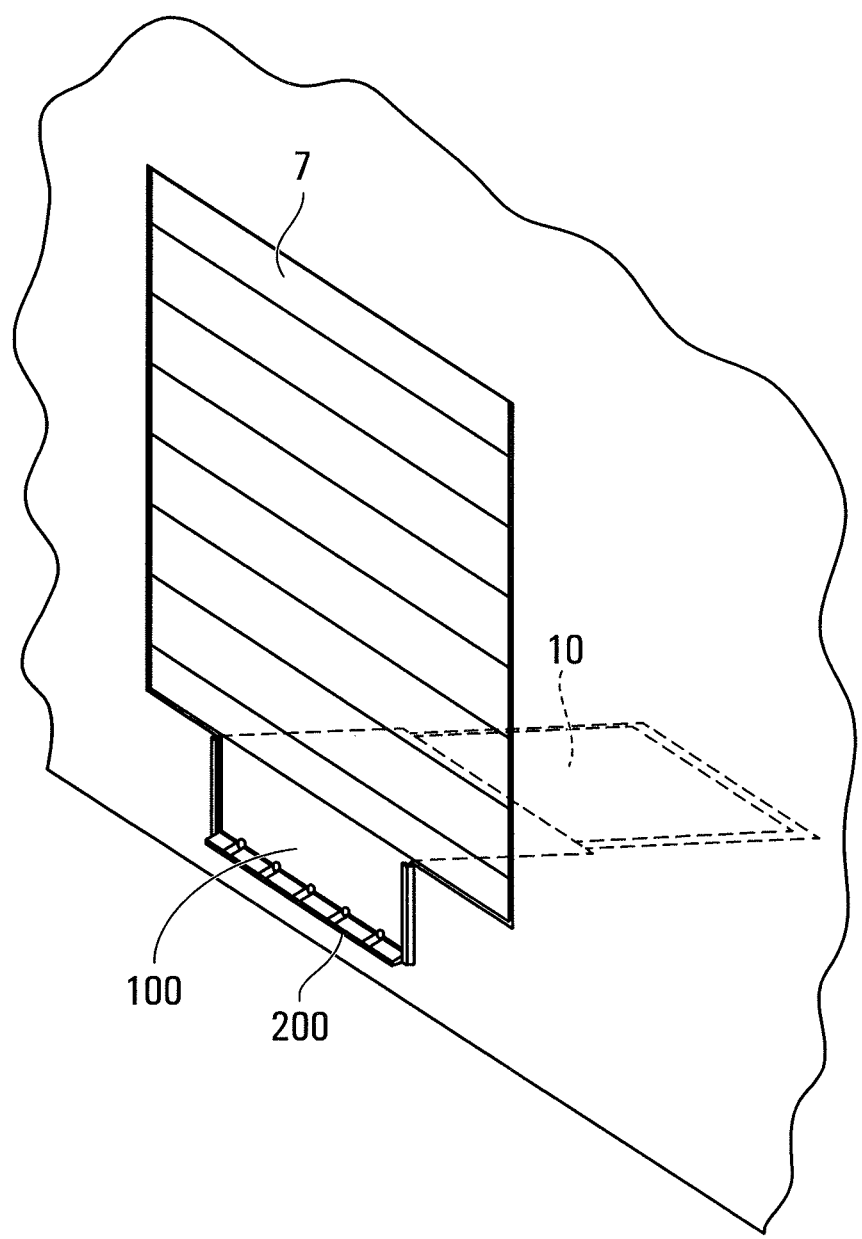
FIG. 13A and FIG. 13B are, respectively, front perspective and top plan views of the sealing assembly of FIG. 4A, deployed over the retracted dock leveler of FIG. 2, with the loading dock door closed atop the sealing assembly.
Figure 13B:
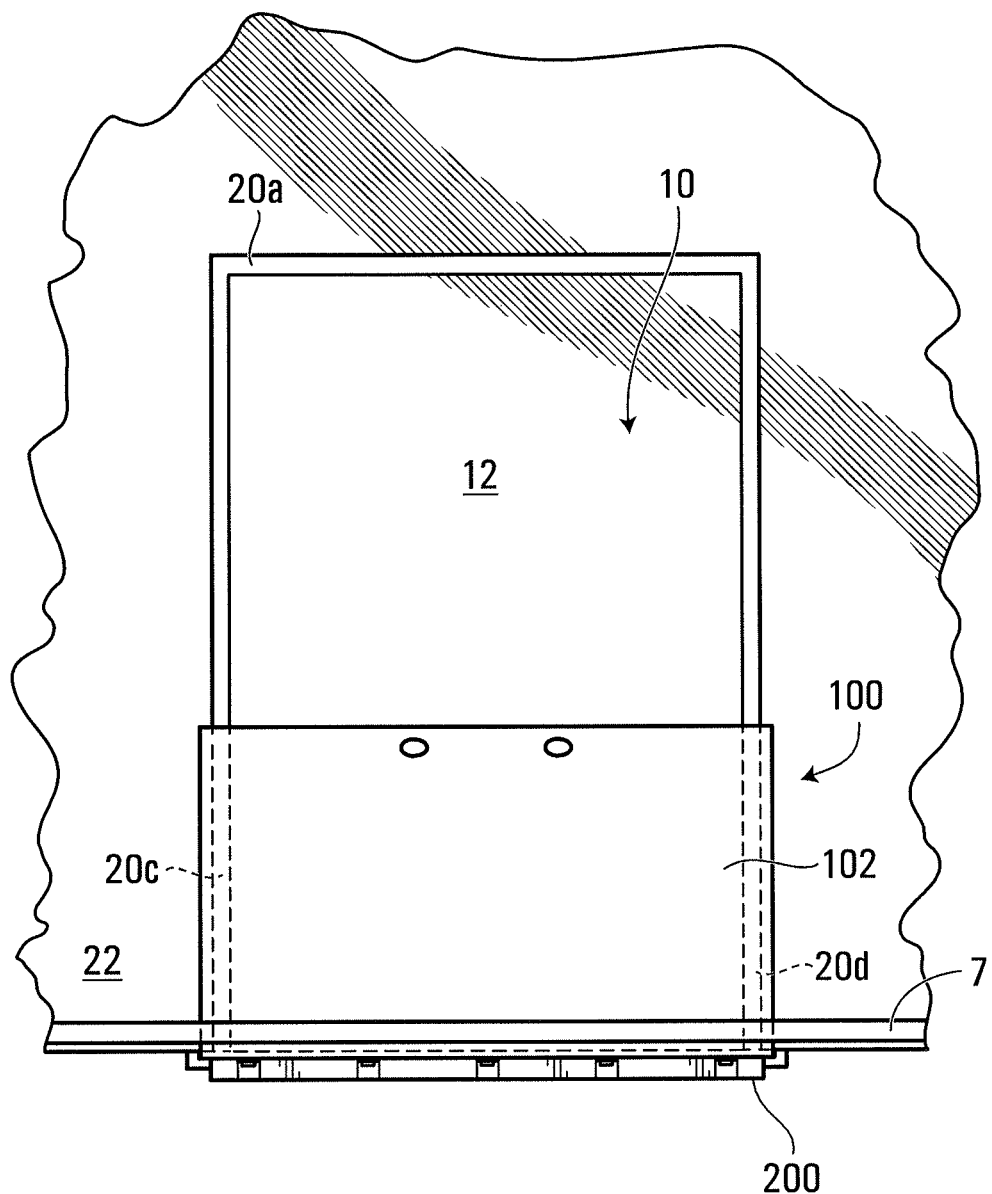

With mat 100 deployed, door 7 of dock 2 may be closed to shut opening 6. As depicted in FIG. 13A and FIG. 13B, door 7 may be closed atop horizontal portion 102. When closed, door 7 may press horizontal portion 102 to floor 24, and thereby hold mat 100 in place. Optionally, weather stripping may be installed along the bottom edge of door 7 to improve the seal between door 7 and mat 100 or floor 24, by way of an existing weather gasket, or the like.

As shown, when door 7 is closed, all parts of gaps 20 are covered by mat 100. Thus, airflow into and out of dock 2 through gaps 20 is substantially restricted. Similarly, movement of heat, moisture, and vermin into and out dock 2 through gaps 20 may also be substantially restricted. Concurrently, when mat 100 is formed of a thermal insulating material, conduction of heat and cold into and out of dock 2 through dock leveler 10 may also be substantially restricted.

When dock leveler 10 needs to be used, door 7 may be opened and mat 100 may be removed from frame 200. Conveniently, mat 100 may be removed from frame 200 by a single person pulling on handholds 106.

Figure 14C:
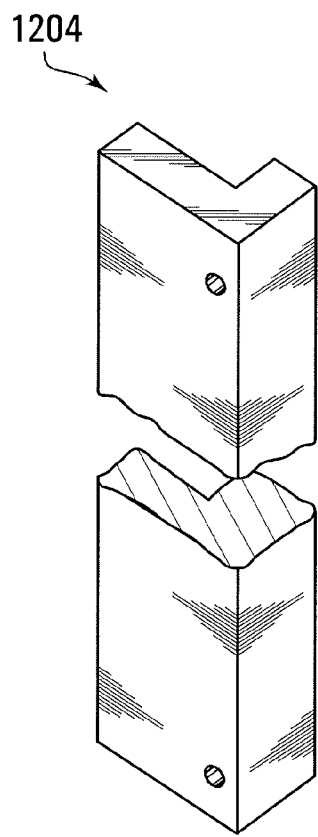
Figure 14C:
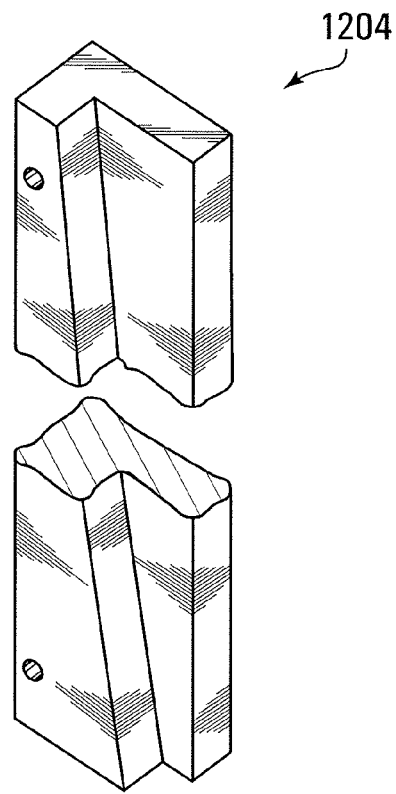
Figure 14C:
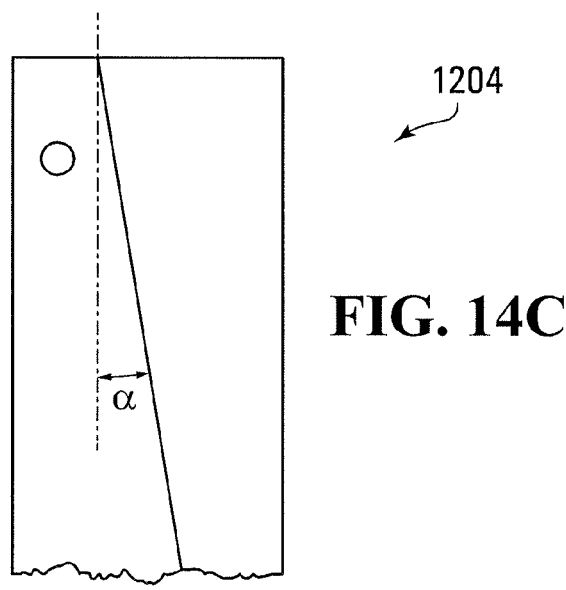
Figure 16:
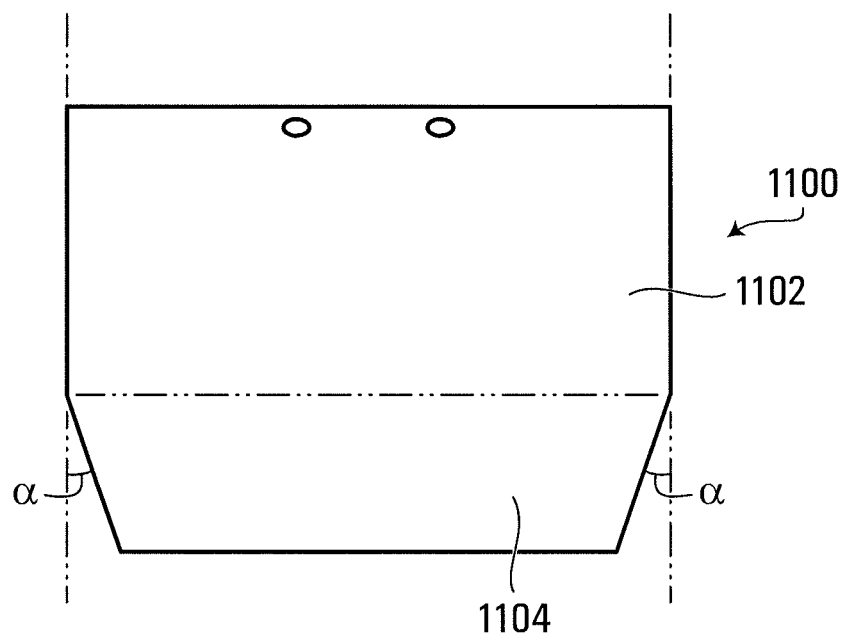
FIG. 16 is a top elevation view of a mat, exemplary of another embodiment.
Figure 17:
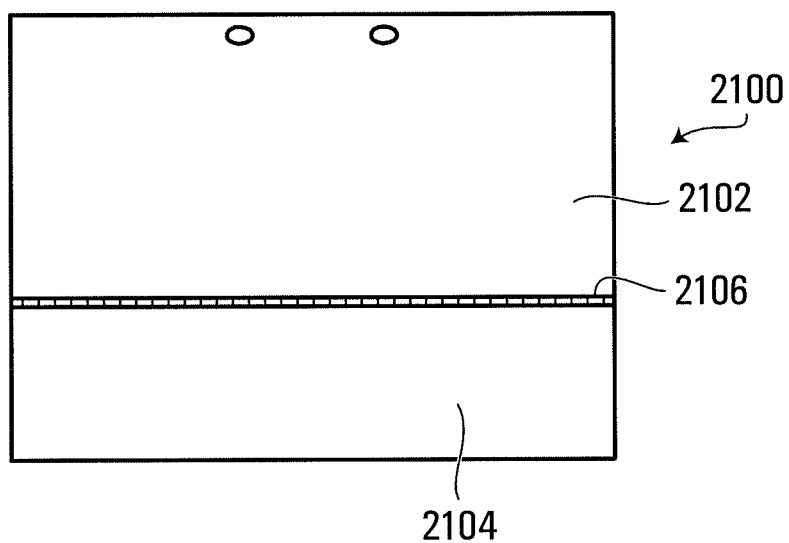
FIG. 17 is a top elevation view of a mat, exemplary of a further embodiment.

In an embodiment, left restraint 202 may be replaced with a left restraint 1204, as depicted in FIG. 14A, FIG. 14B, and FIG. 14C. Left restraint 1204 is substantially similar to left restraint 202, except it is shaped to define a channel that slopes at an angle α (FIG. 14C) from its top end to its bottom end. As a result, the channel defined by left restraint 1204 when mounted is wider at its top end than at its bottom end.

Similarly, right restraint 204 may be replaced with a right restraint 1206, as depicted in FIG. 15A, FIG. 15B, and FIG. 15C. Right restraint 1206 is substantially similar to right restraint 204, except it is shaped to define a channel that slopes at an angle α (FIG. 15C) from its top end to its bottom end. As a result, the channel defined by right restraint 1206 when mounted is wider at its top end than at its bottom end.

So, when restraints 1204 and 1206 are mounted, the respective bottom ends of channels defined by restraints 1204 and 1206 are closer together than respective top ends of the channels.

In this embodiment, mat 100 may be replaced with a mat 1100. Mat 1100 is substantially similar to mat 100, but includes a portion that is tapered to fit within the channels defined by restraints 1204 and 1206. In particular, mat 1100 includes a portion 1102 for covering part of horizontal surface 12 of dock leveler 10, and a portion 1104 for covering vertical surface 14 of dock leveler 10. As shown, portion 1104 has side edges that each taper inwardly at an angle α, complementary to the slope of the channels defined by restraints 1204 and 1206. When the side edges of portion 1104 are received in these channels, portion 1104 meets each of restraints 1204 and 1206 at an angle α, which may improve the quality of the seal formed therebetween.

In the depicted embodiments, α is 10 degrees. However, in other embodiments, α may be an angle between 5 degrees and 20 degrees.

In an embodiment, mat 100 may be replaced with a mat 2100. As depicted, mat 2100 includes a hinge 2106 for folding mat 2100 to define a portion 2102 to cover part of horizontal surface 12 of dock leveler 10, and a portion 2104 to cover vertical surface 14 of dock leveler 10. Hinge 1106 may be a conventional hinge (e.g., a barrel hinge, a butt hinge, or the like). Hinge 1106 may also be a living hinge, e.g., formed by thinning mat 2100 between portions 2102 and 2104 of mat 2100. Providing a hinge such as hinge 2106 allows mat 2100 to be formed from a non-flexible material, or to have a thickness that does not allow the mat to be easily folded.

In an embodiment, restraints 202, 204, and 206 may be spaced from wall 24 to allow mat 100 to clear any protrusions from wall 24 (e.g., dock bumpers, padding, or the like) when deployed. For example, restraints 202, 204, and 206 may be mounted on spacers, which may in turn be mounted on wall 24. Such spacers may be blocks formed from the same material used to form restraints 202, 204, and 206.

In an embodiment, one or more of restraints 202, 204, and 206 may be formed of metal, and mat 100 may attach to a surface of restraints 202, 204, and 206 by way of magnets embedded along the edges of mat 100. As will be appreciated, restraints 202, 204, 206 need not define any channel for receiving an edge of mat 100 but may simply present a surface to which an edge of mat 100 may attach.

In an embodiment, multiple ones of a restraint (e.g., restraint 202, 204, or 206) may be mounted in a line to receive the same edge of a mat 100.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A sealing assembly for a dock leveler retracted into a loading dock beneath a loading dock door,
    said dock leveler and said loading dock defining gaps between a vertical face of said dock leveler and an exterior surface of said loading dock and between a horizontal face of said dock leveler and a floor of said loading dock, said gaps permitting airflow into and out of said loading dock,
    said assembly comprising:
    two side restraints mounted on said loading dock along respective left and right sides of said vertical face of said dock leveler;
    a bottom restraint mounted on said loading dock below said vertical face of said dock leveler;
    a mat removably insertable between said side restraints, said mat sized to allow left and right edges of said mat to engage said side restraints when inserted therebetween, said mat foldable to define a vertical portion that covers said vertical face of said dock leveler and a horizontal portion that covers at least part of said horizontal face of said dock leveler; and
    said mat substantially restricting airflow into and out of said loading dock through said gaps when said vertical portion of said mat is inserted between said side restraints such that a bottom edge of said vertical portion of said mat engages said bottom restraint, and said loading dock door closes atop of said horizontal portion of said mat.

2. The assembly of claim 1, wherein said mat comprises a hinge allowing said mat to be folded.

3. The assembly of claim 2, wherein each of said side restraints defines a channel extending along said respective left and right sides of said vertical face of said dock leveler for receiving a respective one of said left and right edges of said mat.

4. The assembly of claim 3, wherein each of said channels are substantially vertical.

5. The assembly of claim 3, wherein each of said channels are angled such that respective bottom ends of said channels are closer together than respective top ends of said channels.

6. The assembly of claim 5, wherein a top end of said vertical portion of said mat is wider than a bottom end of said vertical portion of said mat.

7. The assembly of claim 2, wherein said bottom restraint comprises a plurality of flanges extending upwardly from said bottom restraint, for engaging said bottom edge of said vertical portion of said mat.

8. The assembly of claim 2, wherein a top surface of said bottom restraint slopes away from said loading dock.

9. The assembly of claim 2, wherein said side and bottom restraints are formed of a high-density polyethylene.

10. The assembly of claim 2, wherein said mat is formed of a high-density polyethylene.

11. The assembly of claim 10, wherein said mat has a thickness between 0.2 inches and 2 inches.

12. The assembly of claim 2, wherein said mat is formed of a flexible material allowing said mat to be folded.

13. The assembly of claim 12, wherein said horizontal portion of said mat substantially covers said horizontal face of said dock leveler.

14. The assembly of claim 2, wherein said mat is formed of a substantially air and moisture impermeable material.

15. The assembly of claim 2, wherein said mat is formed of a thermally insulating material.

16. The assembly of claim 2, wherein said hinge is a living hinge.

17. A method of sealing a dock leveler retracted into a loading dock beneath a loading dock door, said dock leveler and said loading dock defining gaps between a vertical face of said dock leveler and an exterior surface of said loading dock and between a horizontal face of said dock leveler and a floor of said loading dock, said gaps permitting airflow into and out of said loading dock, said method comprising:
  mounting two side restraints on said loading dock along respective left and right sides of said vertical face of said dock leveler;
  mounting a bottom restraint on said loading dock below said vertical face of said dock leveler;
  inserting a mat between said side restraints with left and right edges of said mat engaging said side restraints, until a bottom edge of said mat engages said bottom restraint;
  folding said mat to cover said vertical face of said dock leveler and at least part of a horizontal face of said dock leveler; and
  closing said loading dock door atop a horizontal portion of said mat such that airflow into and out of said loading dock through said gaps is substantially restricted.

\* \* \* \* \*